(12) United States Patent
Henneken et al.

(10) Patent No.: US 11,533,924 B2
(45) Date of Patent: Dec. 27, 2022

(54) DEFROSTING METHOD FOR FOOD

(71) Applicant: Ferdinand Henneken GmbH, Bad Wuennenberg (DE)

(72) Inventors: Kai Henneken, Bad Wuennenberg (DE); Volker Ferdinand Henneken, Bad Wuennenberg (DE)

(73) Assignee: Ferdinand Henneken GmbH, Bad Wuennenberg (DE)

( * ) Notice: Subject to any disclaimer, the term of this patent is extended or adjusted under 35 U.S.C. 154(b) by 441 days.

(21) Appl. No.: 16/295,596

(22) Filed: Mar. 7, 2019

(65) Prior Publication Data
US 2019/0274322 A1 Sep. 12, 2019

(30) Foreign Application Priority Data

Mar. 7, 2018 (DE) .................. 10 2018 105 265.0

(51) Int. Cl.
*A23B 4/07* (2006.01)
*A23L 3/365* (2006.01)

(52) U.S. Cl.
CPC .............. *A23B 4/07* (2013.01); *A23L 3/365* (2013.01); *A23V 2002/00* (2013.01); *A23V 2300/24* (2013.01)

(58) Field of Classification Search
CPC ....... A23B 4/07; A23L 3/365; A23V 2002/00; A23V 2300/24; Y02E 30/30
See application file for complete search history.

(56) References Cited

U.S. PATENT DOCUMENTS 5,401,520 A * 3/1995 Skaar .................. A23L 3/365
426/393
2016/0331004 A1* 11/2016 Strolenberg ............. A23B 4/07

FOREIGN PATENT DOCUMENTS

DE 20 2010 000 603 U1 5/2010
EP 0 574 327 A1 12/1993

OTHER PUBLICATIONS

Anonymous, "Massieranlagen/Massaging Systems MAGNUM II SL/CSL," at http://www-compass-tr.com/files/inject-star/tumbler/magnum2-serisi/Magnum-II_Versand.pdf, pp. 1-8 (Apr. 1, 2016) including English translation.

* cited by examiner

*Primary Examiner* — Drew E Becker
*Assistant Examiner* — Chaim A Smith
(74) *Attorney, Agent, or Firm* — Muncy, Geissler, Olds & Lowe, P.C.

(57) ABSTRACT

A defrosting method for food, in particular meat, the food being filled into a container rotatable around a rotation axis and heated and rotated after the container is filled, heated air being supplied to the container through a supply opening for the purpose of heating the food and discharged through a discharge opening.

11 Claims, 1 Drawing Sheet

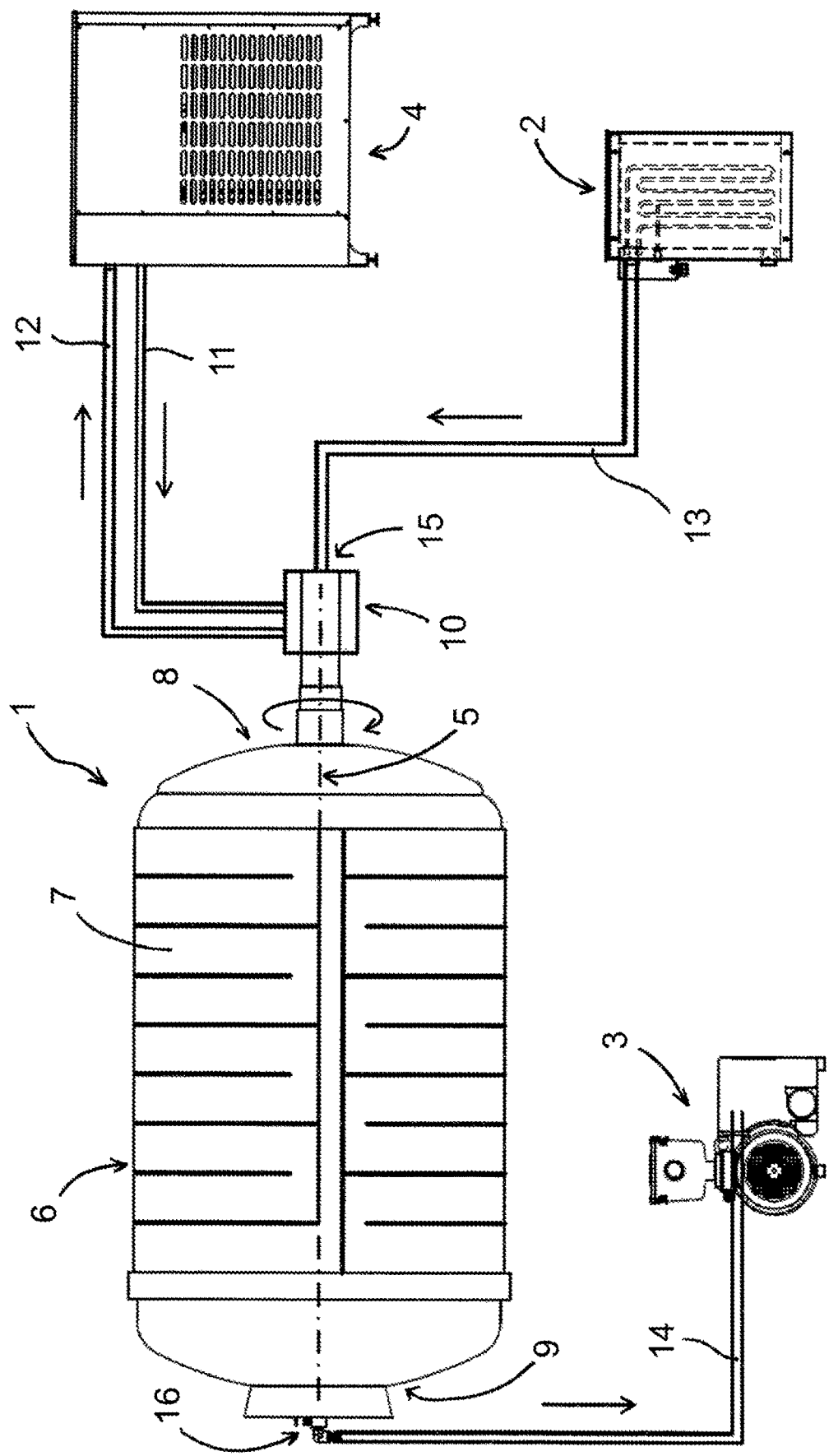

DEFROSTING METHOD FOR FOOD

This nonprovisional application claims priority under 35 U.S.C. § 119(a) to German Patent Application No. 10 2018 105 265.0, which was filed in Germany on Mar. 7, 2018, and which is herein incorporated by reference.

BACKGROUND OF THE INVENTION

Field of the Invention

The present invention relates to a method for defrosting food, in particular meat, the food being filled into a container rotatable around a rotation axis and heated and rotated after filling the container. In particular, a tumbler comprising a rotating drum (container) is used to defrost the food.

Description of the Background Art

According to classic methods, food today is defrosted by gently heating it over a long period of time in a defrosting chamber. The disadvantage is that the food takes a long time to defrost. In addition, fluid escapes from the food during the defrosting process, with the result that a weight loss occurs and an economic harm arises. The escaped fluid also contains components, such as proteins, which are then no longer available in the subsequent processing processes. Product defects and a reduced product quality may thus occur.

To counteract the disadvantages of the classic defrosting method, so-called tumblers are increasingly being used to defrost food and in particular meat. In the tumblers, which have a rotating drum for the food, the fluid emerging during defrosting is reincorporated into the product due to the rotation and the resulting mechanical influence upon the food.

For example, a tumbler includes a double jacket having fluid channels. A heated fluid (brine) may flow through the fluid channels for defrosting the food. In addition, a heated water vapor may be introduced into the drum to further accelerate the defrosting process. The water vapor comes into contact with the surface of the food over a wide area and thus ensures that it is uniformly and quickly heated. However, the disadvantage here is that fluid in the form of water is introduced by supplying water vapor. If the water penetrates the food, this causes a reduction in quality. Moreover, the subsequent processing processes may be impaired if the water mixes with the fluid escaping from the food during defrosting and abraded material forms on the surface of the product or in the container. Only a very small portion of the abraded material may be reincorporated into the product. In addition, it is perceived as a quality defect. Finally, during further processing, the product, including the abraded material, contaminates conveyor belts, filter systems or other processing equipment after defrosting.

SUMMARY OF THE INVENTION

It is therefore an object of the present invention to provide an improved defrosting method for food and, in particular, for meat.

To achieve the object, the invention is characterized in that heated air is supplied to the container through a supply opening for the purpose of heating the food and discharged through a discharge opening.

An advantage of the invention is that the addition of fluid is not necessary during the supply of heated air, or at least the quantity of fluid may be reduced, with the result that an undesirable introduction of external fluid into the product and the formation of abraded material is counteracted. At the same time, the defrosting process takes place gently and quickly, since the energy input is comparatively high, and the heated air flows uniformly around the food in the container.

It is provided, in an example, that the rotation axis of the container is oriented at an incline with respect to the vertical. For example, the rotation axis is provided to extend horizontally. It may be provided that the supply opening for the heated air is provided on a first end face of the container, and the discharge opening is provided on a second end face of the container opposite the first end face.

Within the meaning of the invention, heated air is mentioned when the air supplied to the container is suitable to defrost food provided in the container, due to its temperature. If the food has a temperature of −18° C., for example, and the ambient temperature outside the container is 20° C., the heated air may be supplied at a temperature of, for example, 6° C.

For example, the heated air may be pumped into the container via the supply opening. To remove the heated air, an actuatable valve, for example, may be assigned to the discharge opening.

The heated air can be transported with the aid of a pump. In particular, the heated air may be drawn into the container through the supply opening and be extracted through the discharge opening with the aid of the pump. A structurally simple and robust design advantageously results due to the provision of the pump and the suction of the heated air through the container.

The container filled with the food can rotate around the rotation axis while the heated air is being drawn in and extracted. A particularly effective mixing and, as a result, a simultaneously gentle and fast defrosting process are advantageously provided, due to the simultaneous rotation of the container and the supply and/or extraction of the air.

The heated air can be drawn into the container and extracted from the container at the same time. According to the invention, a continuous and particularly fast and economical defrosting method is thus formed. In particular, it may be provided that the heated air is continuously drawn into the container and extracted from the container.

Fluid channels can be provided on the jacket of the container, through which a temperature-controlled fluid flows while the container filled with the food rotates around the rotation axis. In particular, the fluid may flow through the fluid channels of the container while the heated air is being drawn into the container or extracted from the container. The defrosting process may be advantageously further optimized by the simultaneously fluidic heating of the container jacket and the supply or extraction of the heated air. In particular, a good heat supply may be provided by combining the two method features.

The container can be filled with the food via the supply opening. In particular, the filling may take place by means of a vacuum loading. Air is then extracted from container through the discharge opening with the aid of the pump and, as a result, the food is sucked in via the supply opening. A suction hose, via which the food is sucked out of a provided container, may be assigned to the supply opening for this purpose. The filling of the container may advantageously take place very rapidly by means of the vacuum loading. On the whole, the method according to the invention is thus particularly economical.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWING

The present invention will become more fully understood from the detailed description given hereinbelow and the accompanying drawing which are given by way of illustration only, and thus, are not limitive of the present invention, and wherein the sole FIGURE shows a schematic representation of an arrangement for carrying out the defrosting method according to the invention.

DETAILED DESCRIPTION

The arrangement comprises a tumbler 1, an air conditioning unit 2 for heating air, a pump 3 and a fluid conditioning unit 4 as essential function components. Tumbler 1 includes a container 6 rotatable around a horizontally extending rotation axis 5. Container 6 includes a temperature-controllable double jacket having a fluid channel 7 as well as end faces 8, 9 situated opposite each other. A rotary leadthrough 10 is assigned to a first end face 8. A feed line 11 and a return line 12 for a fluid are provided from fluid conditioning unit 4 to rotary leadthrough 10. The fluid, which is temperature-controlled in fluid conditioning unit 4 and conducted to rotary leadthrough 10 via feed line 11, then flows through fluid channel 7 of tumbler 1 and returns to fluid conditioning unit 4 via return line 12. The fluid may be heated or cooled in fluid conditioning unit 4 to flow through fluid channel 7 at a predefined temperature. In particular, fluid conditioning unit 4 may provide means for setting or changing the volume flow of the fluid.

A supply line 13 is furthermore run to rotary leadthrough 10. Supply line 13 connects rotary leadthrough 10 of tumbler 1 to air conditioning unit 2. Heated air is provided by air conditioning unit 2. The heated air enters container 6 of the tumbler via supply line 13 and the rotary leadthrough when pump 3 is operated, and air is extracted from container 6 via an extraction line 14 run from pump 3 to tumbler 1 with the aid of pump 3.

To conduct the heated air through container 6, a supply opening 15 for the heated air is provided on first end face 8, and a discharge opening 16 is provided on opposite second end face 9. In particular, it may be provided that supply opening 15 and discharge opening 16 are provided coaxially to rotation axis 5 of container 6. Supply opening 15 may be assigned to rotary leadthrough 10 of tumbler 1.

Container 6 of tumbler 1 is filled with food for the purpose of defrosting food. Container 6 of tumbler 1 is then rotated around rotation axis 5 with the aid of a drive unit, which is not illustrated. The temperature-controlled fluid flows through fluid channel 7, and air heated by air conditioning unit 2 is additionally drawn into container 6 and extracted from container 6 with the aid of pump 3. The food in container 6 is then quickly and gently heated. At the same time, fluid escaping from the food during defrosting is reincorporated into the food as a result of the rotating movement, and the constitution of the food consequently does not change, or only to a slight degree, during defrosting.

Depending on the constitution of the food and/or the quantity, the defrosting process may be influenced or configured during defrosting, in particular by appropriately selecting the quantity and/or the temperature of the heated air. However, the temperature and the flow rate of the fluid through fluid channel 7 of container 6 may be adjusted. In particular, it may be provided that heated air is conducted through container 6 and the fluid flows through fluid channel 7 at the same time to defrost the food. For example, either the fluid conducted through fluid channel 7 or the heated air may be used for defrosting.

According to the invention, it may be provided, in particular, that the heated air is continuously transported through container 6. Unlike the water vapor today, the heated air is then not supplied sequentially. It may furthermore be provided that more than one fluid channel 7 is provided for the fluid on container 6.

To fill container 6, it may be provided, for example, that air is pumped out of container 6 with the aid of pump 3, and the food is sucked into container 6 via supply opening 15. For this purpose, a suction hose, in particular, may be provided at supply opening 15, which is run in a container provided for the food.

The invention being thus described, it will be obvious that the same may be varied in many ways. Such variations are not to be regarded as a departure from the spirit and scope of the invention, and all such modifications as would be obvious to one skilled in the art are to be included within the scope of the following claims

What is claimed is:
1. A defrosting method for food, the method comprising:
   filling the food into a container that is rotatable around a rotation axis, the container having a first end face and a second end face that opposes the first end face, wherein a rotary leadthrough is provided at the first end face; and
   heating and rotating the food after filling the container, wherein heated air is supplied to heat the food, the heated air being supplied to the container through a supply opening and discharged through a discharge opening,
   wherein the supply opening is provided at the rotary leadthrough at the first end face of the container and the discharge opening is provided at the second end face of the container,
   wherein a jacket is provided on the container, the jacket having fluid channels through which a temperature-controlled fluid flows,
   wherein the temperature-controlled fluid is cooled and supplied by a fluid conditioning unit, the fluid conditioning unit having a fluid feed line and a fluid return line that are both connected to the jacket via the rotary leadthrough, such that the temperature-controlled fluid that is cooled is supplied to the rotary leadthrough by the fluid feed line, flows through the fluid channels of the jacket and then flows back to the fluid conditioning unit via the fluid return line to be cooled, and
   wherein at the same time that the temperature-controlled fluid flows through the fluid channels of the jacket, the heated air is continuously supplied to the container and discharged from the container while the container filled with the food rotates around the rotation axis.
2. The defrosting method according to claim 1, wherein the heated air is transported with the aid of a pump.

3. The defrosting method according to claim 2, wherein the heated air is drawn into the container through the supply opening with the aid of the pump and extracted through the discharge opening.

4. The defrosting method according to claim 3, wherein the discharge opening is connected to the pump via an extraction line and wherein the heated air extracted through the discharge opening is expelled to an outside atmosphere via the pump.

5. The defrosting method according to claim 1, wherein the food is filled into the container and removed therefrom via a shared filling and removal opening, which is provided on the container on an end face and coaxially to the rotation axis.

6. The defrosting method according to claim 1, wherein the container is filled with the food via the supply opening.

7. The defrosting method according to claim 6, wherein the food is filled into the container by vacuum loading, and wherein air is extracted from the container through the discharge opening and the food is sucked in with the aid of a pump.

8. The defrosting method according to claim 1, wherein the heated air is supplied and/or discharged coaxially to the rotation axis, and/or wherein the rotation axis is provided at an incline with respect to a vertical direction.

9. The defrosting method according to claim 1, wherein the heated air and/or the food is filled into the container via the first end face thereof and/or is removed from the container via the second end face opposite the first end face.

10. The defrosting method according to claim 1, wherein an air conditioning unit is provided, the air conditioning unit being provided at a distance from the container, and wherein the heated air is conducted from the air conditioning unit to the supply opening via a supply line.

11. The defrosting method according to claim 1, wherein the heated air is supplied and discharged coaxially to the rotation axis.

* * * * *